United States Patent [19]
Owashi et al.

[11] Patent Number: 5,231,479
[45] Date of Patent: Jul. 27, 1993

[54] LUMINANCE/CHROMINANCE SIGNAL SEPARATION CIRCUIT HAVING FILTER CIRCUIT USING PULSE PATTERNS SUPPRESSING CIRCUIT

[75] Inventors: Hitoaki Owashi, Yokohama; Kooji Minabe, Katsuta; Katsuyuki Watanabe, Katsuta; Koichi Ono, Katsuta; Kenji Ichige, Katsuta; Hiroto Yamauchi, Katsuta, all of Japan

[73] Assignee: Hitachi, Ltd., Tokyo, Japan

[21] Appl. No.: 597,411

[22] Filed: Oct. 15, 1990

[30] Foreign Application Priority Data

Oct. 25, 1989 [JP] Japan ................... 1-275805
Jul. 31, 1990 [JP] Japan ................... 2-201553

[51] Int. Cl.$^5$ ............................................. H04N 9/78
[52] U.S. Cl. ............................................. 358/31
[58] Field of Search ......................... 358/21 R, 30, 31

[56] References Cited

FOREIGN PATENT DOCUMENTS 27188 2/1988 Japan .
108890 4/1989 Japan .
319387 12/1989 Japan .

OTHER PUBLICATIONS

Flicker-Free Non Interlaced Receiving System For Standard Color TV Signals, by Okada, et al., IEEE Transactions on Consumer Electronics, vol./CE-31, No. 3, Aug. 1985 pp. 240-254.
New Filter Technology In Picture Processing, By Okada, et al., IEEE Transactions on Consumer Electronics, vol. CE-28, No. 3, Aug. 1982, pp. 158-167.

*Primary Examiner*—Tommy Chin
*Attorney, Agent, or Firm*—Antonelli, Terry, Stout & Kraus

[57] ABSTRACT

A color picture signal processing circuit, a filter circuit and a luminance/carrier chrominance signal separation circuit implemented by employing the filter circuit. The circuit processing signal includes an adaptive-type (C) comb line filter through which the luminance signal is caused to pass. The output of the filter undergoes amplitude limitation in a limiter circuit, the output of which is subtracted from the original luminance signal. The carrier chrominance signal is added to the luminance signal to obtain a composite picture signal. The filter circuit is comprised of a pulse pattern suppressing circuit including a decision circuit for deciding which of positive and negative patterns the three adjacent data form constitute, a positive pulse pattern suppressing circuit, a negative pulse pattern suppressing circuit and a circuit selecting for either one of the output signal of the positive and negative pulse pattern suppressing circuits in accordance with the result of decision made by the decision circuit.

7 Claims, 9 Drawing Sheets

LUMINANCE/CHROMINANCE SIGNAL SEPARATION CIRCUIT HAVING FILTER CIRCUIT USING PULSE PATTERNS SUPPRESSING CIRCUIT

BACKGROUND OF THE INVENTION

The present invention generally relates to a color picture or video signal processing circuit employed in a magnetic recording/reproducing apparatus or the like. More particularly, the invention is concerned with a filter circuit for noise elimination or reduction, a circuit for generating a composite color picture (video) signal by adding or mixing together a separated luminance signal and a separated carrier chrominance signal by making use of the filter circuit and a luminance/chrominance signal separation circuit for extracting separately the luminance signal and the carrier chrominance signal from the composite color picture signal.

As an attempt for improving the quality of picture generated by magnetic picture recording/reproducing apparatuses (hereinafter also referred to as VTR in abbreviation) for home use, there have been established standards which permit the recording band to be widened. By way of example, according to the S-VHS standards, frequency band is broadened to 5 MHz, as a result of which there arises a need for improving or enhancing the performance of a Y/C separation circuit for separating the picture or video signal into a luminance signal (Y) and a carrier chrominance signal (C). However, in the present state of the art, the degree of Y/C separation is at most on the order of 30 dB. Consequently, there exist inevitably vestigial carrier chrominance signal components in the luminance signal.

Heretofore, a comb line filter has been employed for eliminating the vestigial carrier chrominance signal components. An example of this technique is disclosed in JP-A-63-27188.

An example of the filter designed for filtering a signal by making use of a pattern thereof is disclosed in "IEEE Trans. on Consumer Electronics", Vol. CE-28, No. 3 (August, 1982), pp. 157-167.

Further, a luminance/carrier chrominance signal separating circuit for separating a luminance signal and a carrier chrominance signal from a color picture signal is disclosed in "IEEE Trans. on Consumer Electronics", Vol. CE-31, No. 3 (August, 1983, pp. 24054 and JP-A-1-108890.

SUMMARY OF THE INVENTION

When the carrier chrominance signal components remain in the luminance signal, addition of the reproduced luminance signal and carrier chrominance signal upon reproduction results in generation of zerobeat and hence color Moire due to interference between the vestigial chrominance signal components contained in the luminance signal and the carrier chrominance signal.

In the case of the hitherto known techniques mentioned above, high frequency components of the luminance signal become dull or slack in the vertical direction because the luminance signal is caused to pass through a comb line filter. Thus, there arises a problem that the resolution in the vertical direction is deteriorated, presenting a so-called "obscure or dull picture".

The filter circuit disclosed in "IEEE Trans. on Consumer Electronics", Vol. CE-28, No. 3 (August, 1982), pp. 157-167, is designed on the presumption that a signal is constituted by data rows each of a predetermined period, wherein the filtering is realized by correcting deformation of the data row pattern brought about by noise.

However, the filter circuit described above suffers a problem that because two positive and two negative logic conversion circuits are employed, the number of the requisite circuits such as minimum value selecting (MIN) circuits, maximum value selecting (MAX) circuits and others becomes enormously large, increasing correspondingly the circuit scale.

Further, the techniques disclosed in "IEEE Trans.", Vol. CE-31 cited above are disadvantageous in that cross color phenomenon and degradation in the resolution of the luminance signal take place at the edge portions of multi-bursts. The technique disclosed in the JP-A-1-108890 can solve effectively the problem mentioned above. However, this technique suffers another problem in that erroneous correction is performed at the vertical edge portions of the chrominance signals, giving rise to generation of dot disturbance, which problem has not been encountered in the prior art luminance/carrier chrominance signal separation circuit.

A first object of the present invention is to provide a circuit for mixing or adding together a luminance signal and a carrier chrominance signal while suppressing generation of the color Moiré and protecting the luminance signal against degradation or deterioration in the vertical resolution.

A second object of the present invention is to provide a filter circuit which can be implemented on a reduced circuit scale.

A third object of the present invention is to provide a luminance/carrier chrominance separation circuit in which the filter circuit mentioned above is made us of and which is capable of preventing erroneous operation of the filter circuit even at the vertical edge portion.

In view of the above objects, it is proposed according to an aspect of the present invention that the luminance signal is caused to pass through an adaptivetype chrominance (C) comb line filter, the output signal of which is limited in amplitude by a limiter circuit to be subsequently subtracted from the original luminance signal. Further, the carrier chrominance signal is added to (or mixed with) the luminance signal to constitute a composite color picture (video) signal as the output signal.

In JP-A-1-319387 which has been published after the date on the basis of which the present application claims priority, there is disclosed an example of the luminance/chrominance signal separation circuit.

DESCRIPTION OF THE PREFERRED EMBODIMENTS

In the following, the present invention will be described in detail in conjunction with preferred embodiments thereof by reference to the drawings.

Figure 1:
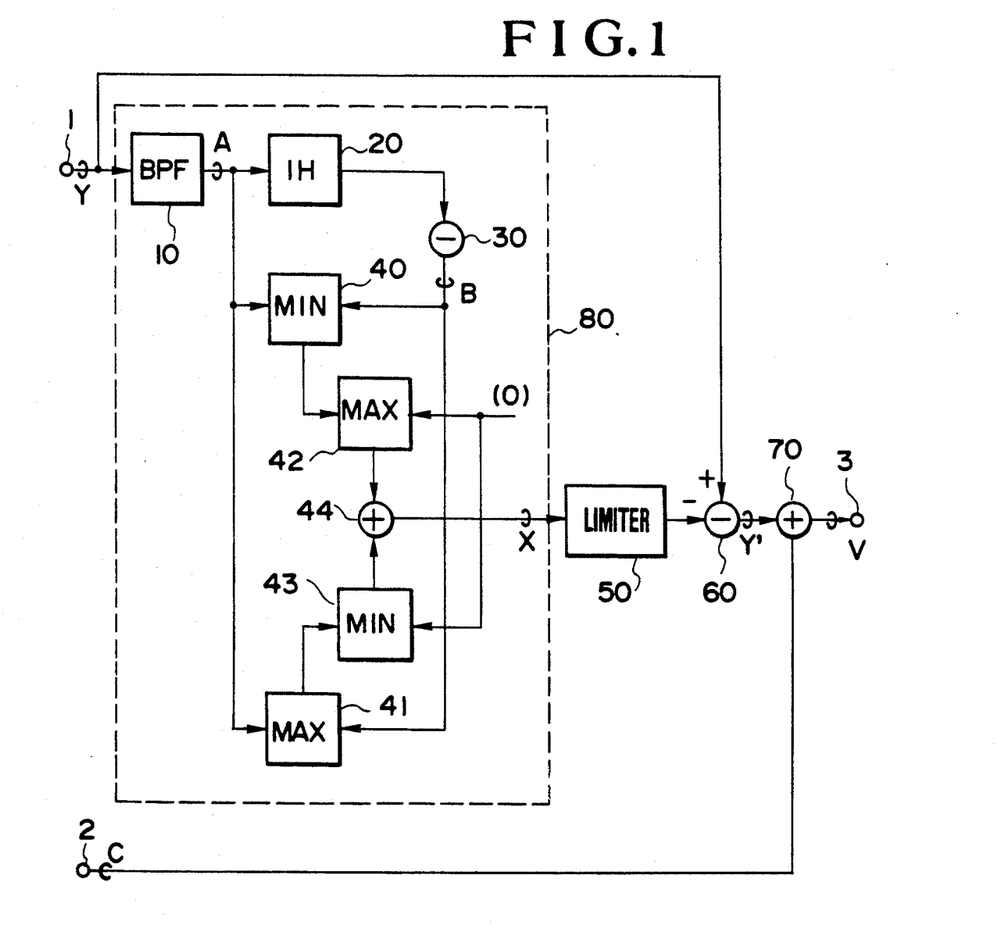
FIGS. 1 and 2 are block diagrams showing, respectively, embodiments of the present invention.

FIG. 1 shows a block diagram of a color picture or video signal processing circuit according to an embodiment of the invention which is adapted to generate a composite color picture signal from a luminance signal and a carrier chrominance signal separated from each other. Referring to the figure, reference numeral 1 denotes an input terminal for a luminance signal Y, numeral 2 denotes an input terminal for a carrier chrominance signal C, numeral 3 denotes an output terminal of a composite color picture (video) signal V, 10 denotes a band pass filter (hereinafter also referred to as BPF in abbreviation), 20 denotes a 1H-delay circuit (where 1H represents one horizontal scanning period), 30 denotes a sign inversion circuit, 40 and 43 denote minimum value selecting (MIN) circuits, respectively, 41 and 42 denote maximum value selecting (MAX) circuits, respectively, 44 denotes an addition circuit, 50 denotes a limiter circuit, 60 denotes a subtraction circuit, 70 denotes another addition circuit, and numeral 80 denotes an adaptive-type (C) comb line filter (i.e. the comb line filter for separating and outputting the carrier chrominance signal).

The luminance signal Y inputted through the terminal 1 is inputted to the adaptive-type (C) comb line filter 80 and a plus (+) terminal of the subtraction circuit 80. The adaptive-type (C) comb line filter 80 has such characteristic that it passes therethrough a frequency corresponding to $f_H/2$ (where $f_H$ represents the horizontal frequency) which has undergone a band limitation to a chrominance signal frequency band by the BPF 10 and multiplied with an odd integer, as will hereinafter be described in detail. The output signal of the adaptive-type (C) comb line filter 80 is subjected to an amplitude limitation by the limiter circuit 50 and then inputted to a minus (−) terminal of the subtraction circuit 60. In the subtraction circuit 60, there are subtracted from the luminance signal Y a residual or vestigial chrominance signal components and noise components detected by the adaptive-type (C) comb line filter 80. An output signal Y' of the subtraction circuit 60 and the carrier chrominance signal C are added together by the addition circuit 70 to be outputted as the composite color picture or video signal V from the terminal 3.

By virtue of elimination of the signal components in the frequency range of the carrier chrominance signal C to be added or mixed through the subtraction circuit 60, as mentioned above, the addition or mixing of the luminance signal Y' and the carrier chrominance signal C exerts no disturbance to the carrier chrominance signal C, whereby the occurrence of color Moiré can be positively excluded.

Next, description will be made of the adaptive-type (C) comb line filter 80. The input signal to the adaptive-type (C) comb line filter 80 undergoes a band limitation to the frequency band of the carrier chrominance signal by the BPF 10, the output signal of which is inputted to the minimum value selecting (MIN) circuit 40 and the maximum value selecting (MAX) circuit 41, respectively, while being delayed by 1H (one horizontal scanning period) through the 1H-delay circuit 20 and inverted in sign by the sign inversion circuit 30 to be subsequently inputted to the minimum value selecting circuit 40 and the maximum value selecting circuit 41. Since the phase of the carrier chrominance signal is inverted for every 1H, the carrier chrominance signal inputted directly to the minimum value selecting circuit 40 and the maximum value selecting circuit 41 is in phase with the carrier chrominance signal inputted to these circuits 40 and 41 after the delay by 1H and the sign inversion. In other words, so long as hue (i.e. color) and saturation (i.e. density) do not vary in the vertical direction, the carrier chrominance signals before and after the delay of 1H and the sign inversion assume a same signal level. The minimum value selecting circuit 40 selects as the output the signal from both signals inputted thereto which has a lower level. Similarly, the maximum value selecting circuit 41 selects as the output the signal of a higher level. The output signals of the selecting circuits 40 and 41 ar applied to the inputs of the maximum value selecting circuit 42 and the minimum value selecting circuit 43, respectively. Both of these selecting circuits 42 and 43 have other input terminals, respectively, to which a zerolevel signal is applied. Through comparison of the chrominance inputs to the circuits 42 and 43 with the zero-level signal, the maximum level and the minimum level are selected, respectively, to be subsequently added together by the addition circuit 44.

In the following table 1, there are indicated relations between the typical values of the signal A before being delayed by 1H and the signal B undergone the 1H-delay and sign inversion together with the corresponding output signals X of the adaptive-type (C) comb line filter.

TABLE 1

| A    | B    | X    |
|------|------|------|
| 1    | 0.5  | 0.5  |
| 0.5  | 1    | 0.5  |
| −1   | −0.5 | −0.5 |
| −0.5 | −1   | −0.5 |
| 1    | −0.5 | 0    |
| −1   | 0.5  | 0    |
| 1    | 0    | 0    |
| 0    | 1    | 0    |

As can be seen from the above table 1, when the values of the signals A and B are of the same sign, the signal having a smaller absolute value is selected as the chrominance signal component to be outputted. On the other hand, when the signals A and B are of different signals, the zero-level signal is selected. When both signals A and B are of the same sign, it may be regarded that the chrominance signal component is present, while the signals of the different signs can be regarded as representing the luminance signal component. Thus, it is possible to separate the chrominance signals by the adaptive-type (C) comb line filter 80.

Further, at the vertical edge portion of the luminance signal, either the signal A is "138 with the signal B being "0" or the signal A is "0" with the signal B being "1". In both cases, however, the output of the adaptive-type (C) comb line filter is "0". At this juncture, it should be mentioned that in the case of the comb line filters known heretofore, error detection has been performed at the vertical edge portion of the luminance signal for the separation of the chrominance signal component, which results in degradation in the vertical resolution. In contrast, according to the system of the present invention, separation of the chrominance signal is not effected at the vertical edge portion of the luminance signal, whereby the vertical resolution can be protected against degradation or deterioration.

On the other hand, even at the vertical edge portion of the chrominance signal, the signal A may be "1" with the signal B being "0" or vice versa. In that case, the output of the adaptive-type (C) comb line filter 80 is "0". At the vertical edge portion of the chrominance signal where the signal A is "1" with signal B being "0", the level of the chrominance signal is intrinsically "1". However, in this case, the chrominance signal is not detected. Accordingly, although the color Moiré can not be eliminated at the vertical edge portion of the chrominance signal, the vertical resolution of the luminance signal can be prevented from degradation. Besides, since the color Moiré makes appearance only for one line of the vertical edge portion of the chrominance signal, there can arise no problem.

It should be noted that the limiter circuit 50 serves for the limitation of amplitude, when the output level of the adaptive type (C) comb line filter 80 is high. In the case of the line-type comb line filter incorporating a 1H-delay line, it is impossible to discriminate the oblique pattern of the luminance signal and the chrominance signal from each other. Consequently, error detection is performed with the oblique pattern of the luminance signal, whereby high level is outputted. Accordingly, when such high level is subtracted intact from the luminance signal Y, oblique resolution of the luminance signal will be remarkably degraded. For preventing such degradation, there is used the limiter circuit 50.

It is known that the oblique patterns of luminance signal and the chrominance signal can be separated by resorting to a frame-type comb line filter operative on a frame delay basis. Thus, the signal outputted from the terminal 3 can be visualized or seen more effectively or efficiently by connecting a television receiver incorporating the frame-type comb line filter.

Conversely, when such a television receiver is used which incorporates the line-type comb line filter, the limiter circuit 50 may be spared without impairing the advantageous effects of the present invention to any appreciable extent.

Figure 2:
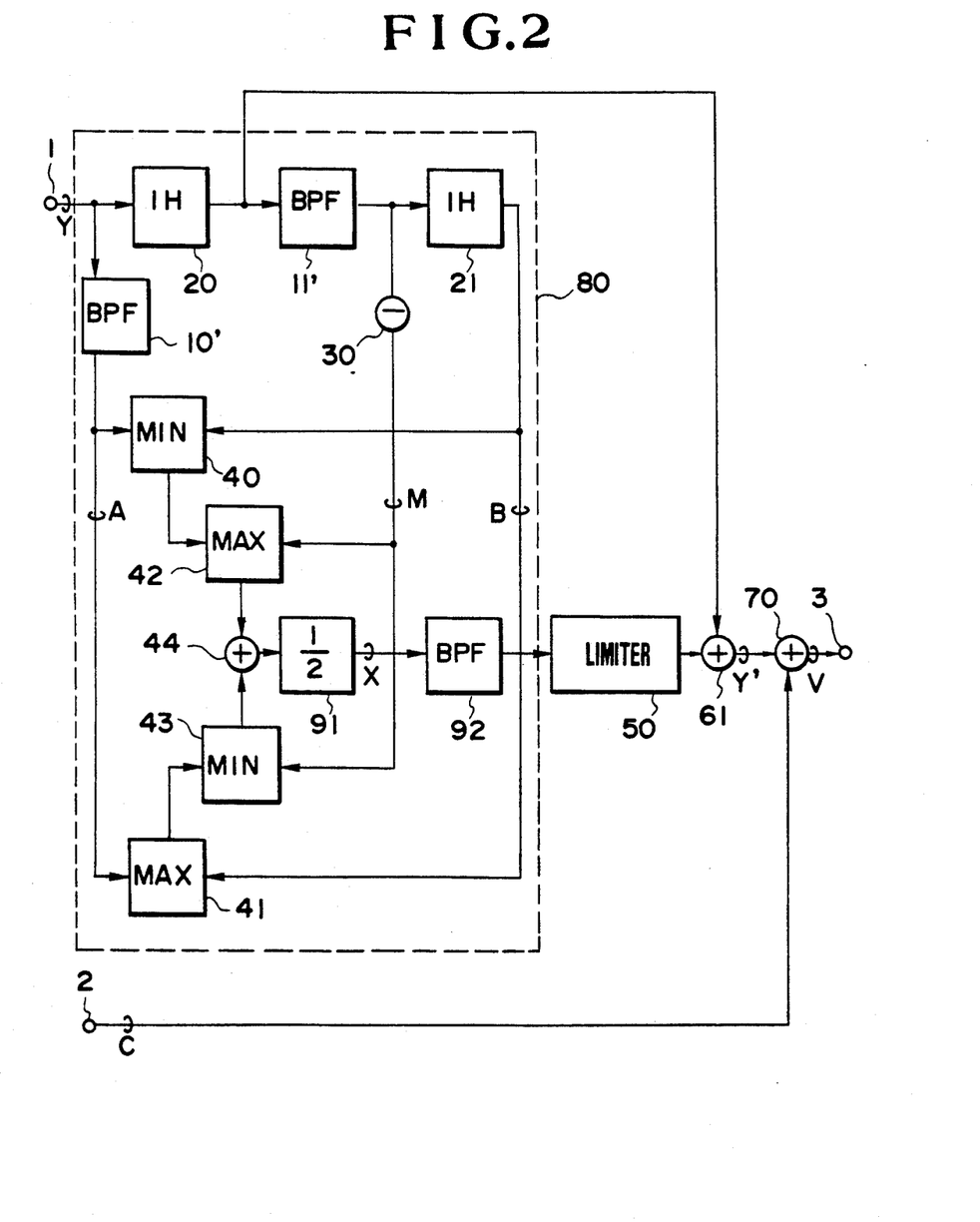

FIG. 2 shows a color picture signal processing circuit according to still another embodiment of the invention in which a pair of 1H-delay circuits are used and in which the luminance signal undergoes a delay of 1H. The circuit arrangement shown in FIG. 2 shares partially a common feature with the embodiment shown in FIG. 1. Accordingly, the parts like or equivalent to those shown in FIG. 1 are denoted by like reference numerals and detailed description thereof will be omitted In FIG. 2, reference numerals 10', 11' and 92 denote band pass filters or BPFs, respectively, 21 denotes a 1H-delay circuit, 61 denotes an addition circuit, and numeral 91 denotes an attenuation circuit for multiplying the amplitude of an output signal of the addition circuit 61 with ½. The addition circuit 44 and the attenuation circuit 91 cooperate to add together the amplitudes of output signals of the maximum value selecting circuit 42 and the minimum value selecting circuit 43 and output an average of the amplitudes.

The luminance signal Y inputted through the terminal 1 is applied to the inputs of the BPF 10' and the 1H-delay circuit 20, respectively. The luminance signal Y delayed by 1H is inputted to the 1H-delay circuit 21 via the BPF 11. The output of the 1H-delay circuit 21 is inputted to the minimum value selecting circuit 40 and the maximum value selecting circuit 41, respectively. At this juncture, it should be mentioned in conjunction with manufacture of the BPF that an attempt for realizing steep filter characteristics involves a sudden increase in the circuit scale. Under the circumstance, the BPF is implemented divisionwise in two stages in order to reduce the circuit scale. The BPFs 10' and 11' have broader band characteristics when compared with the BPF 10 shown in FIG. 1. The BPF 92 serves to supplement the characteristics of the BPFs 10' and 11'. To this end, the overall characteristics of the BPFs 10' and 92 and the BPFs 11' and 92 are so designed as to be equivalent to the characteristics of the BPF 10. Since the phase of the chrominance signal is inverted for every 1H, the output signal of the BPF 11' is inverted in respect to the sign by the sign inversion circuit 30. In this way, so long as the color does not change in the vertical direction, the output signal levels of the BPF 10', the sign inversion circuit 30 and the 1H-delay circuit 21 become equal to one another. In the following table 2, there are indicated relations between the typical values of the output signals A, B and M of the BPF 10', the 1H-delay circuit 21 and the sign inversion circuit 30, respectively, and the output signal X of the attenuation circuit 91.

TABLE 2

| A | M | B | X | Remarks |
| --- | --- | --- | --- | --- |
| 1 | 1 | 1 | 1 | Chrominance Signal |
| 1 | −1 | 1 | 0 | Luminance Signal |
| 0 | 1 | −1 | 0.5 | ⎫ Vertical Edge of |
| −1 | 1 | 0 | 0.5 | ⎭ Luminance signal |
| 0 | 1 | 1 | 1 | ⎫ Vertical Edge of |
| 1 | 1 | 0 | 1 | ⎭ Chrominance Signal |

As can be seen from the above table 2, in the chrominance signal portion in which no change occurs in the vertical direction and where the output X is "1", the chrominance signal is separated. In the luminance signal portion, the output X is "0". At the vertical edge portion of the luminance signal, the output X is "0.5" and error detection takes place. However, by virtue of the amplitude limitation by the limiter circuit, degradation in resolution of the luminance signal can substantially be neglected without incurring any material problem. At the vertical edge portion of the chrominance signal, the output X is "1". According to the instant embodiment, the color Moiré can be eliminated because the chrominance signal can be separated accurately. Further, due to the operation of the adaptive-type (C) comb line filter, no sag or slack can make appearance in the luminance signal in the vertical direction. Although the amplitude of the luminance signal is lowered a little, no substantial problem arises as to the visual sensation, because the level of the signal which has undergone error detection is limited by the limiter circuit.

Figure 3:
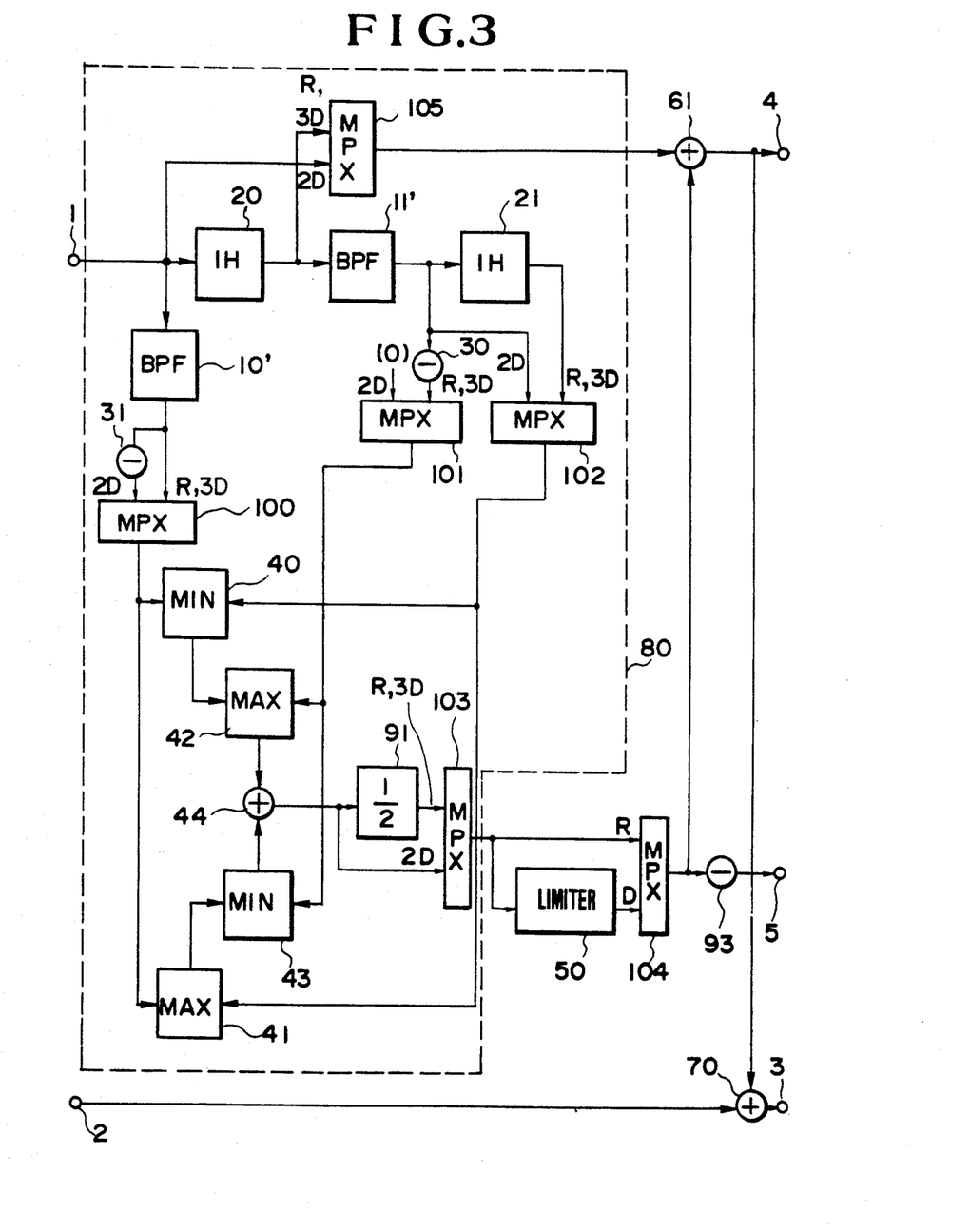
FIG. 3 is a block diagram showing an embodiment of a luminance/carrier chrominance separation circuit to which the teachings of the invention are applied.

FIG. 3 is a block diagram showing a Y/C separation circuit for separating a composite picture signal into a luminance and a carrier chrominance signal in combination with a circuit for obtaining the composite picture signal which circuit incorporates a comb line filter for the elimination of the color Moiré according to an embodiment of the invention.

In FIG. 3, reference numeral 4 denotes an output terminal for the luminance signal produced from the Y/C (luminance/chrominance) separation, 5 denotes an output terminal for the carrier chrominance signal produced from the Y/C separation, 31 and 93 denote sign inverting circuits, respectively, and 100 to 105 denote signal changeover switch (MPX) circuits, respectively.

When the circuit of FIG. 3 is to be used as the Y/C separation circuit, the changeover switch (MPX) circuit 100 to 105 are switched such that the signals at the input terminals R are selected to be outputted. On the other hand, in case the circuit FIG. 3 is to be used as the adaptive-type (C) comb line filter for eliminating or suppressing the color Moiré, the changeover switch circuits 100 to 105 are switched such that the signals at the input terminals D, 2D and 3D are selected to be outputted.

Operation of such Y/C separation circuit is discussed in detail in "IEEE, Trans. on Consumer Electronics" Vol. CE-31, No. 3, August 1985, pp. 244-247, the disclosure of which is hereby incorporated by reference. Accordingly, further description of the Y/C separation circuit is omitted.

When the circuit shown in FIG. 3 is to be used as a circuit for obtaining a composite color picture signal by synthesizing the luminance signal and the chrominance signal, which circuit includes the adaptive-type (C) comb line filter to this end, the changeover switch (MPX) circuit 104 is closed to the terminal D while the changeover switch circuits 100-103 and 105 are closed to the terminal 2D, to thereby constitute the circuit as shown in FIG. 1. In this circuit configuration, the sign inverting circuit 31 is provided in precedence to the 1H-delay circuit 20, while the addition circuit 61 is used in place of the subtruction circuit 60 in consideration of the sign. In these respects, the circuit configuration shown in FIG. 3 differs from that shown in FIG. 1. When the circuit configuration including the above-mentioned Y/C separation circuit is to be used as the adaptive-type (C) comb line filter, the changeover switch (MPX) circuit 104 may be closed to the terminal D with the changeover switch circuits 100 to 103 and 105 being closed to the respective terminals 3D.

In the above description, delays in the individual circuits elements ar not taken into account. It goes however without saying that such delays are inevitable in the practical circuits. Accordingly, when a single line is first branched into branch lines which are to be again combined, such measures should be taken that delays in the branch lines are made equal to one another, as is known in the art. In this conjunction, it is noted that when the picture signal processing of concern is realized by resorting to the digital signal processing, the problem of delay mentioned above can satisfactorily be coped with by using D-type flip-flops. In that case, the delay time can be controlled accurately without giving rise to deterioration in the characteristics such as frequency deviation and the like, whereby desired characteristics can be ensured satisfactorily.

In the embodiment of the picture signal processing apparatus shown in FIG. 3, arrangement is made such that, as a color Moiré eliminating comb line filter, the configuration of FIG. 3 can be selectably changed to form the configuration shown in FIG. 1 and to form another circuit configuration. In case the structure shown in FIG. 1 is selected, the centroid of the luminance signal obtained from the terminal 4 coincides with that of the luminance signal inputted through the terminal 1. On the other hand, when the another configuration is selected, the centroid of the luminance signal at the terminal 4 coincides with that of the luminance signal delayed for 1H.

When the comb line filter according to the present invention is applied to a VTR (Video Tape Recorder), the comb line filter is used for eliminating cross-talk of the chrominance signal from the adjacent tracks in the reproduced chrominance signal processing circuit of the VTR. To this end, there is used generally the comb line filter incorporating a 1H-delay line. Consequently, the centroid of the chrominance signal is delayed by an amount equivalent to a half of a line in the reproduced chrominance signal processing circuit. In this case, the color Moiré eliminating comb line filter for the luminance signal is implemented in he circuit configuration shown in FIG. 1. When dubbing editing is to be performed between VTRs, the reproduced signal after the editing has undergone twice the reproduced chrominance signal processing, i.e. first upon reproduction for editing and again upon reproduction of the tape undergone the editing. Accordingly, the chrominance signal is caused to pass through the comb line filter twice for eliminating the cross-talk from the adjacent tracks, as a result of which the centroid of the chrominance signal is delayed by one line in total. In that case, the luminance signal may be delayed by one line. To this end, the other circuit configuration mentioned above may be selected as the color Moiré eliminating comb line filter to be used for the luminance signal upon editing, while the comb line filter of the structure shown in FIG. 1 may be used upon reproduction of the tape resulting from the editing. In this case, delay corresponding to one line in total will be involved. In this way, the centroids of the chrominance signal and the luminance signal can be aligned with each other while suppressing color mismatch.

According to the embodiment described above, the vestigial chrominance signal component contained in the luminance signal can be separated and eliminated with an improved reliability without possibility of erroneous separation of the luminance signal. Even in case the luminance signal should be erroneously separated, the level thereof can be suppressed to a negligible level by using the limiter circuit. Thus, the luminance signal can be protected against degradation in the vertical resolution. Further, the color Moiré making appearance upon addition of the luminance signal and the chrominance signal can be eliminated.

Figure 4:
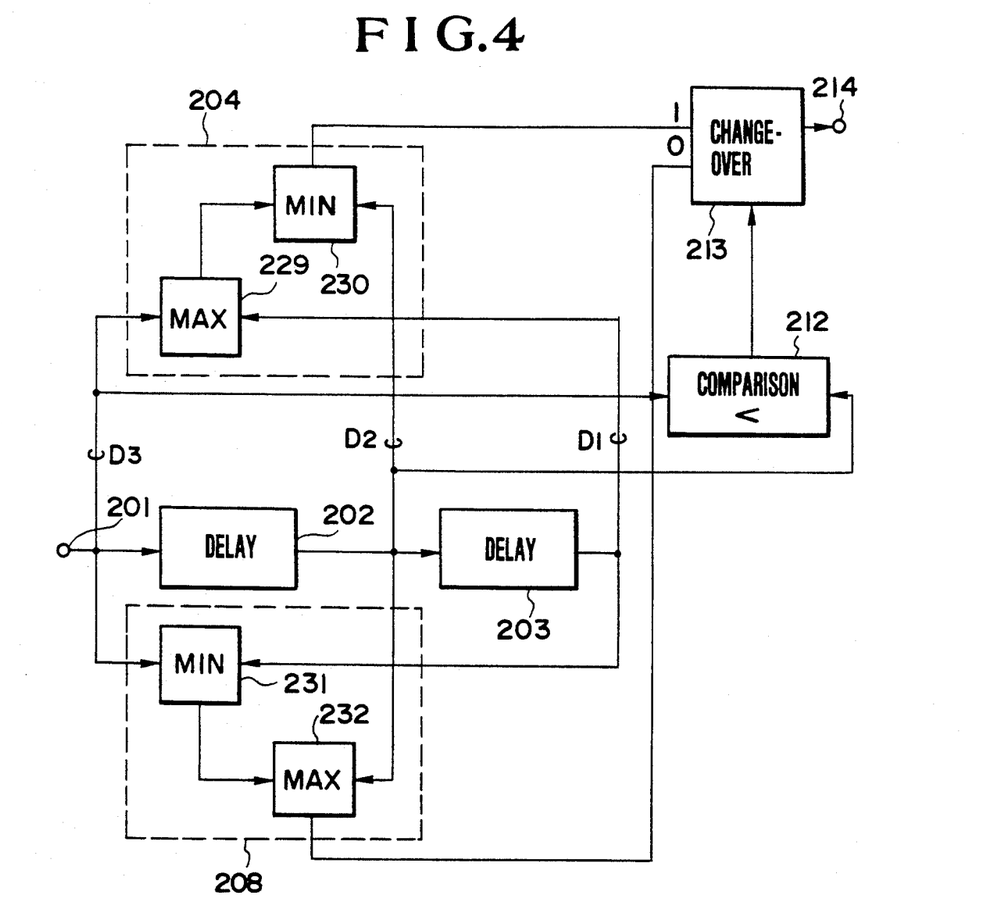
FIGS. 4 and 5 are block diagrams showing, respectively, embodiments of filter circuits according to the invention.

FIG. 4 is a block diagram showing an embodiment of the invention applied to a noise suppressing filter. In FIG. 4, reference numeral 201 denotes an input terminal, 202 and 203 denote delay circuits, respectively, 204 denotes a positive pulse pattern suppressing circuit, 230 denotes a minimum value selecting circuit (hereinafter also referred to simply as MIN circuit), 229 denotes a maximum value selecting circuit (hereinafter also referred to simply as MAX circuit), 208 denotes a negative pulse pattern suppressing circuit, 232 denotes a MAX circuit, 231 denotes a MIN circuit, 212 denotes a level comparing circuit, 213 denotes a changeover switch circuit, and numeral 214 denotes an output terminal.

Referring to FIG. 4, signal data is inputted through the input terminal 201 at a predetermined period and delayed sequentially through the delay circuit 202 and 203 connected in series and each exhibiting an amount of delay equal to the period of the data. Both the output data and the input data of these delay circuits 202 and 203 are supplied to the positive pulse pattern suppressing circuit 204 and the negative pulse pattern suppressing circuit 208, respectively.

In the positive pulse pattern suppressing circuit 204, the MAX circuit 229 selects one of input data $D_3$ and output data $D_1$ of the delay circuit 203 which has a greater value than the other, while the MIN circuit 230 selects one of the output data from the MAX circuit 229 and output data $D_2$ of the delay circuit 202 which has a smaller value. Thus, the positive pulse pattern of the data $D_1$, $D_2$ and $D_3$ is suppressed by the positive pulse pattern suppressing circuit 204.

In the negative pulse pattern suppressing circuit 208, the MIN circuit 231 selects one of the data $D_1$ and $D_3$ which has a smaller value than the other, while the MAX circuit 232 selects one of the output data from the MIN circuit 211 and the data $D_2$ which is of a smaller value than the other. Thus, the negative pulse pattern of the data $D_1$, $D_2$ and $D_3$ is suppressed by the negative pulse pattern suppressing circuit 208.

The positive pulse pattern suppressing circuit 204 outputs one of the data $D_1$ and $D_3$ which has a grater value than the other, when $D_2 > D_1$, and when $D_2 > D_3$, and otherwise outputs the data $D_2$.

The negative pulse pattern suppressing circuit 208 outputs either the data $D_1$ Or $D_3$ which iS Of a smaller value, when $D_1 > D_2$ and $D_3 > D_2$, and otherwise outputs the data $D_2$.

The output data of the positive pulse pattern suppressing circuit 204 and the negative pulse pattern suppressing circuit 208 for the various pulse patterns of the input data $D_1$, $D_2$ and $D_3$ described above are such as shown in the following table 3.

cal to each other. In other words, the MAX selection of the greater value and the MIN selection of the smaller value are in the relation reverse to each other. In contrast, in the case of the filter circuit shown in FIG. 5, arrangement is made such that the MIN circuit 233 and the MAX circuit 234 operate as the MAX circuit and the MIN circuit, respectively, when the signal data is of the positive pulse pattern, while operating as the MIN circuit and the MAX circuit, respectively, when the signal data is of the negative pulse pattern. The EOR circuits 237 and 238 serve to respond to the result of the positive or negative pulse pattern decision of the comparison circuit 212 to output the results of the level comparing circuits 235 and 236, as they are or inverted, for thereby allowing the MIN circuit 233 and the MAX circuit 234 to operate as the MIN circuit or the MAX circuit. Operations of the MIN circuit 233 and MAX circuit 234 in dependence on the values of the data $D_2$ and $D_3$ are summarized in the following table 4.

TABLE 4

Figure 5:
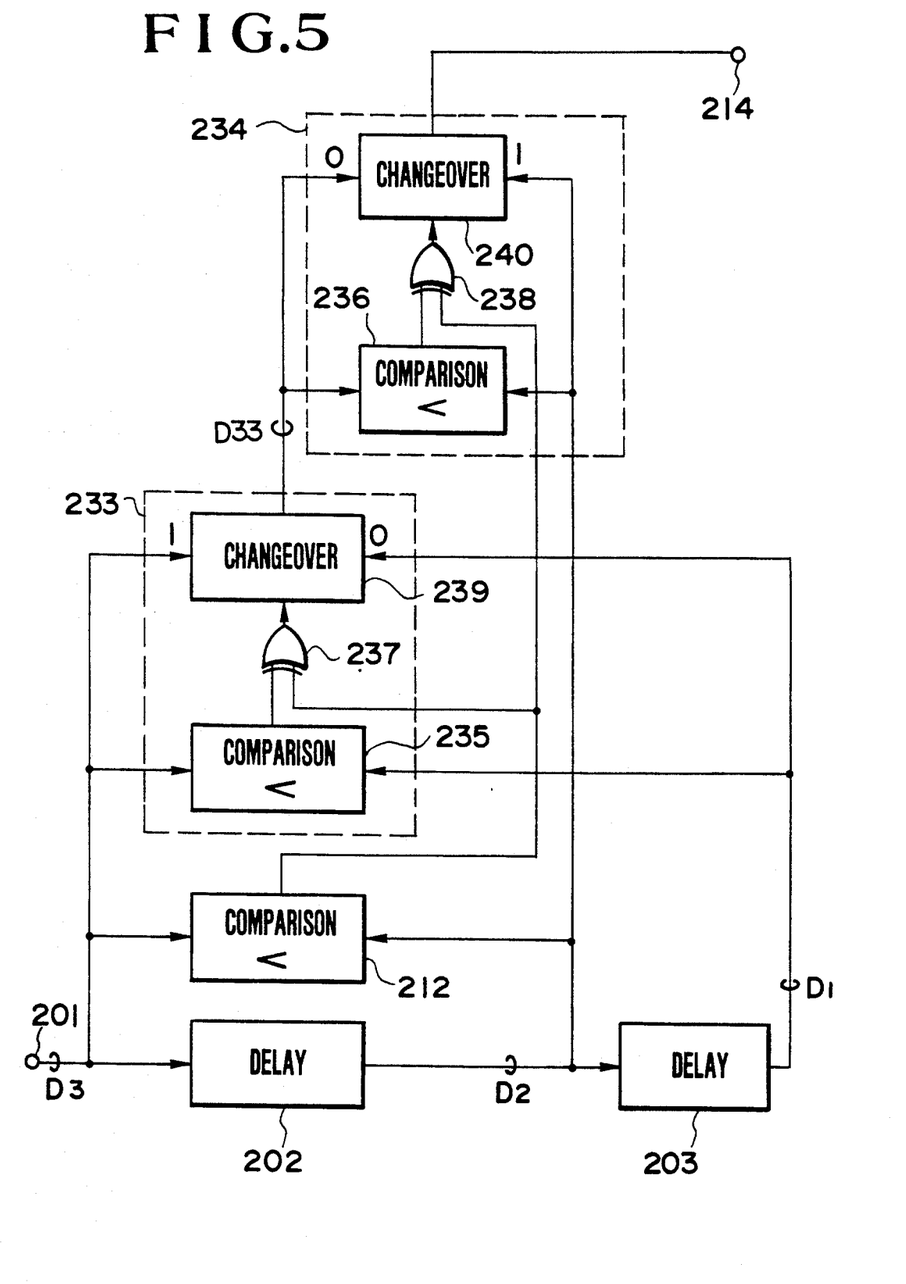

| No. | Relation between $D_2$ and $D_3$ | Operation of MIN/MAX Circuit 233 | Operation of MIN/MAX Circuit 234 | Effects |
| --- | --- | --- | --- | --- |
| I | $D_2 > D_3$ | as MAX | as MIN | Supression of Positive Pulse Pattern |
| II | $D_2 \leq D_3$ | as MIN | as MAX | Suppression of Negative Pulse Pattern |

TABLE 3

| No. | Data Level Relation among $D_1$, $D_2$, $D_3$ | Output of Positive Pulse Pattern Suppressing Circuit 204 | Output of Negative Pulse Pattern Suppressing Circuit 208 | Output of Changeover Circuit 213 |
| --- | --- | --- | --- | --- |
| I | /\ | $D_3$ | $D_2$ | $D_3$ |
| II | /\ | $D_1$ | $D_2$ | $D_1$ |
| III | \/ | $D_2$ | $D_3$ | $D_3$ |
| IV | \/ | $D_2$ | $D_1$ | $D_1$ |
| V | // | $D_2$ | $D_2$ | $D_2$ |
| VI | \\ | $D_2$ | $D_2$ | $D_2$ |

As will be understood from the above description, noise can effectively be suppressed with a simplified circuit configuration according to the embodiment of the invention shown in FIG. 4.

FIG. 5 is a block diagram showing still another embodiment of the filter circuit according to the present invention. In the figure, reference numerals 233 and 234 denote MIN/MAX circuits, respectively, 235 and 236 denote level comparing circuits, respectively, 237 and 238 denote EOR (Exclusive-OR) circuits, respectively, and 239 and 240 denote changeover switch circuits, respectively. It will be seen that in the filter circuit shown in FIG. 4, the MAX circuit 229 and the MIN circuit 231 are symmetrical to each other and the MIN circuit 230 and the MAX circuit 232 are also symmetri- As can be seen from the above table 4, with the circuit configuration shown in FIG. 5, it is possible to change over the positive pulse pattern suppression and the negative pulse pattern suppression with each other without changing the circuit structure, whereby the circuit configuration can be much simplified over the one shown in FIG. 4 while ensuring the similar advantageous effects as the latter.

Figure 6:
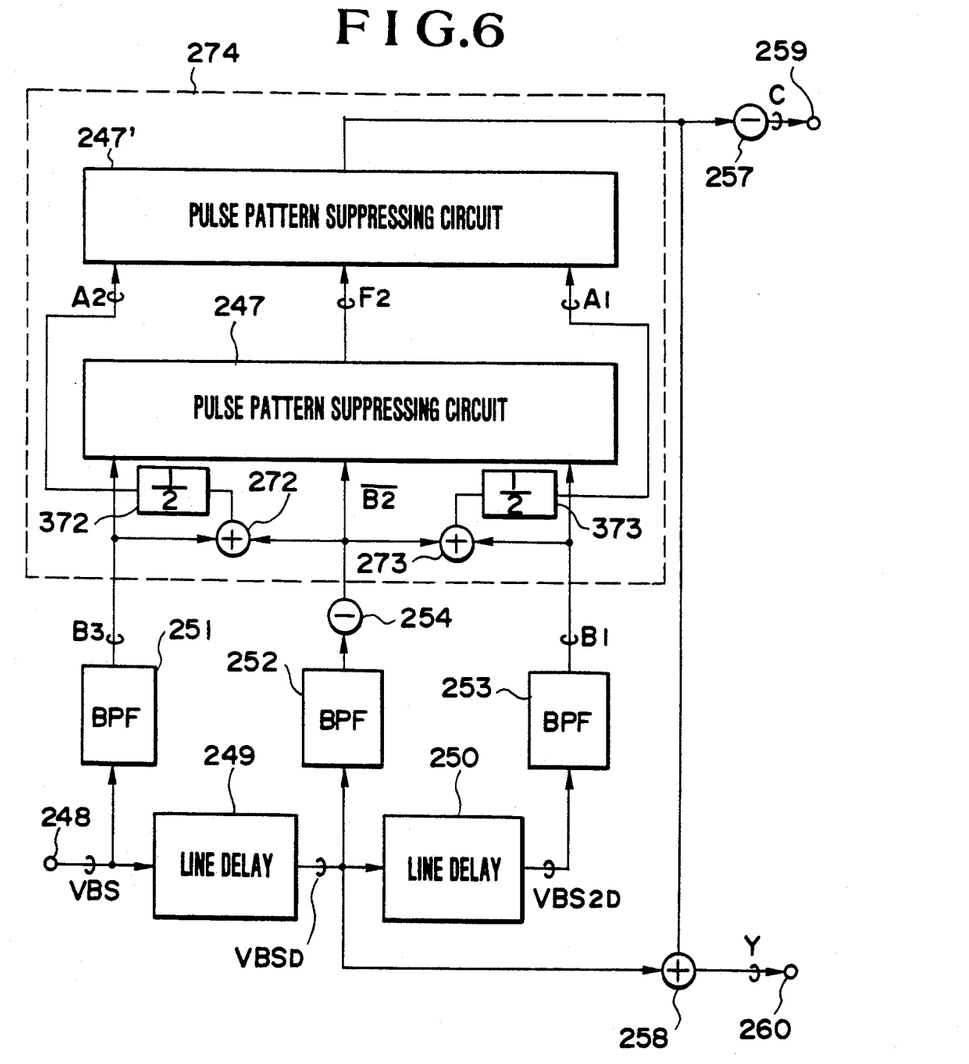
FIG. 6 is a block diagram showing an embodiment of a luminance/carrier chrominance separation circuit according to the invention.

Now, description will be directed to the luminance/carrier chrominance signal separation circuits according to embodiments of the invention to which the embodiments described in the foregoing are applied FIG. 6 is a block diagram showing a luminance/carrier chrominance separating circuit according to an embodiment of the present invention. In the figure, reference numeral 248 denotes an input terminal, 249 and 250 denote line-delay circuits, respectively, 251 to 253 denote band pass filters (BPF), respectively, 254 denotes an inverter, 247 and 247' denote pulse pattern suppressing circuits, respectively, 272 and 273 denote addition circuits, respectively, 372 and 373 denote attenuation circuits, respectively, 257 denotes an inverter, 258 denotes an addition circuit, and numerals 259 and 260 denote output terminals, respectively. The pulse pattern suppressing circuit 247 and 247' may each be constituted by the positive pulse pattern suppressing circuit 204, the negative pulse pattern suppressing circuit 208, the level comparing circuit 212 and the changeover switch circuit 213, as shown in FIG. 4 or alternatively it may be constituted by the MIN/MAX circuits 233, 234 and the level comparing circuit 212 in the manner shown in FIG. 5.

The color picture signal VBS inputted through the input terminal 248 is delayed by the line-delay circuit 249 to thereby produce a delayed color picture signal $VBS_D$, whereon the delayed color picture signal $VBS_D$ is further delayed through the line-delay circuit 250, whereby a delayed color picture (video) signal $VBS_{2D}$ is obtained. These delayed color picture signals VBS, $VBS_D$ and $VBS_{2D}$ undergo band limitation through the band pass filters or BPFs 251, 252 and 253 having band widths substantially equal to the frequency bands of the respective chrominance signals, whereby the signal components $B_3$, $B_2$ and $B_1$ of the chrominance signal frequency bands (hereinafter referred to as the chroma-band components) are extracted. The chroma-band components $B_1$ and $B_3$ and a chroma-band component $\overline{B_2}$ obtained by inverting the phase of the chroma-band component $B_2$ through the inverter 254 are supplied to the pulse pattern suppressing circuit 247.

Parenthetically, each of the chroma-band components $B_1$ to $B_3$ is the chrominance (carrier chrominance) signal containing the luminance signal component of the frequency band mentioned previously.

The line-delay circuits 249 and 250 are provided for the purpose of obtaining the in-phase chrominance signals of three lines of a same time duration. In the case of the NTSC system, by way of example, the color subcarrier of the chrominance signal undergoes phase inversion on a line-by-line basis. Accordingly, by selecting the amount of delay in each of the line-delay circuits 249 and 250 to be equal to one line, all the color subcarriers of the chrominance signals in the chroma-band components $B_1$, $\overline{B_2}$ and $B_3$ are placed in phase with one another. For the same reason, in the case of the PAL system, the amount of delay in each of the line-delay circuits 249 and 250 is set to be equal to two lines.

It should be added that the chroma-band components $B_1$, $\overline{B_2}$ and $B_3$ inputted to the pulse pattern suppressing circuit 247 correspond, respectively, to the data $D_1$, $D_2$ and $D_3$ described previously in conjunction with FIG. 4.

Assuming now that the chroma-band component $B_1$, $\overline{B_2}$ and $B_3$ bear correlation in the vertical direction at a given time point, then $B_1 \geq \overline{B_2} \geq B_3$ or alternatively $B_1 \leq \overline{B_2} \leq B_3$. The pulse pattern suppressing circuit 247 then selects the chroma-band component $\overline{B_2}$ to be outputted. In that case, because of the aforementioned relation in the level among the chroma-band components $B_1$, $\overline{B_2}$ and $B_3$, the chroma-band component $\overline{B_2}$ consists only of the chrominance signal and contains no luminance signal even when the chroma-band component $B_2$ is inverted in phase through the inverter 254.

When the chroma-band component $B_2$ contains the luminance component, phase inversion of this chroma-band component $B_2$ by the inverter 254 results in either $\overline{B_2} > B_1, B_3$ or $\overline{B_2} < B_1, B_3$. In that case, positive or negative pulse pattern will make appearance for the chroma-band components $B_1$, $\overline{B_2}$, $B_3$. Accordingly, the pulse pattern suppressing circuit 247 selects either the chroma-band component $B_1$ or $B_3$ and outputs a signal $F_2$ while suppressing the positive or negative pulse pattern.

The chroma-band components $B_1$ and $\overline{B_2}$ are added together by the addition circuit 273, the output of which is attenuated in amplitude by a factor of ½ through the attenuation circuit 373, while the chromaband components $\overline{B_2}$ and $B_3$ are added together by the addition circuit 272, the output of which is then attenuated by ½ in the amplitude by the attenuation circuit 372. The output signals $A_1$ and $A_2$ of the attenuation circuits 372 and 373 are supplied to the pulse pattern suppressing circuit 247' together with the output component $F_2$ of the pulse pattern suppressing circuit 247. The input components $A_1$, $F_2$ and $A_2$ correspond, respectively, to the data $D_1$, $D_2$, $D_3$ shown in FIG. 4. Thus, the pulse pattern suppressing circuit 247' suppresses correspondingly the positive or negative pulse pattern for the input components $A_1$, $F_2$ and $A_2$.

When each of the chroma-band components $B_1$, $\overline{B_2}$, $B_3$ consists only of the luminance signal component, then $$B_1, B_2, B_3 = 1, -1, 1$$

Accordingly, the component $F_2$ is "1" with the component $A_1 = A_2 = $"0". Since this represents a positive pulse pattern for the pulse pattern suppressing circuit 247', the latter selects either the component $A_1$ or $A_2$. Consequently, the output component of the pulse pattern suppressing circuit 247' is "0".

The same holds true for the edge portion of the luminance signal at which the chroma-band components $B_1$, $\overline{B_2}$ and $B_3$ are "1", "−1", and "0", respectively.

Further, when only one line of a picture in a same color is not colored and when the chroma-band component $\overline{B_2}$ is to constitute this line, the chroma-band components $B_1$, $\overline{B_2}$ and $B_3$ are "±1", "0" and "±1", respectively, representing the positive or negative pulse pattern for the pulse pattern suppressing circuit 247. As a result, the component $F_2$ is "±1". On the other hand, the output components of the addition circuits 273 and 272 are attenuated by ±½ in the attenuation circuit 373 and 372, respectively, and thus the components $A_1$, $F_2$ and $A_2$ are ±½, ±1 and ±½ for the pulse pattern suppressing circuit 247', representing the positive or negative pulse pattern for the latter. Consequently, the output component of the pulse pattern suppressing circuit 247' is ±½.

In this manner, although the erroneous separation cannot completely be evaded, influence of the erroneous separation is suppressed to a negligible extent.

Similarly, when only one line is colored against the adjacent lines (i.e. when $B_1$, $\overline{B_2}$, $B_3 = 0$, ±1, 0), it is impossible to separate perfectly the chrominance signal. However, the vestigial chrominance signal component remaining in the luminance signal Y obtained at the output terminal 260 can be sufficiently attenuated.

Figure 7:
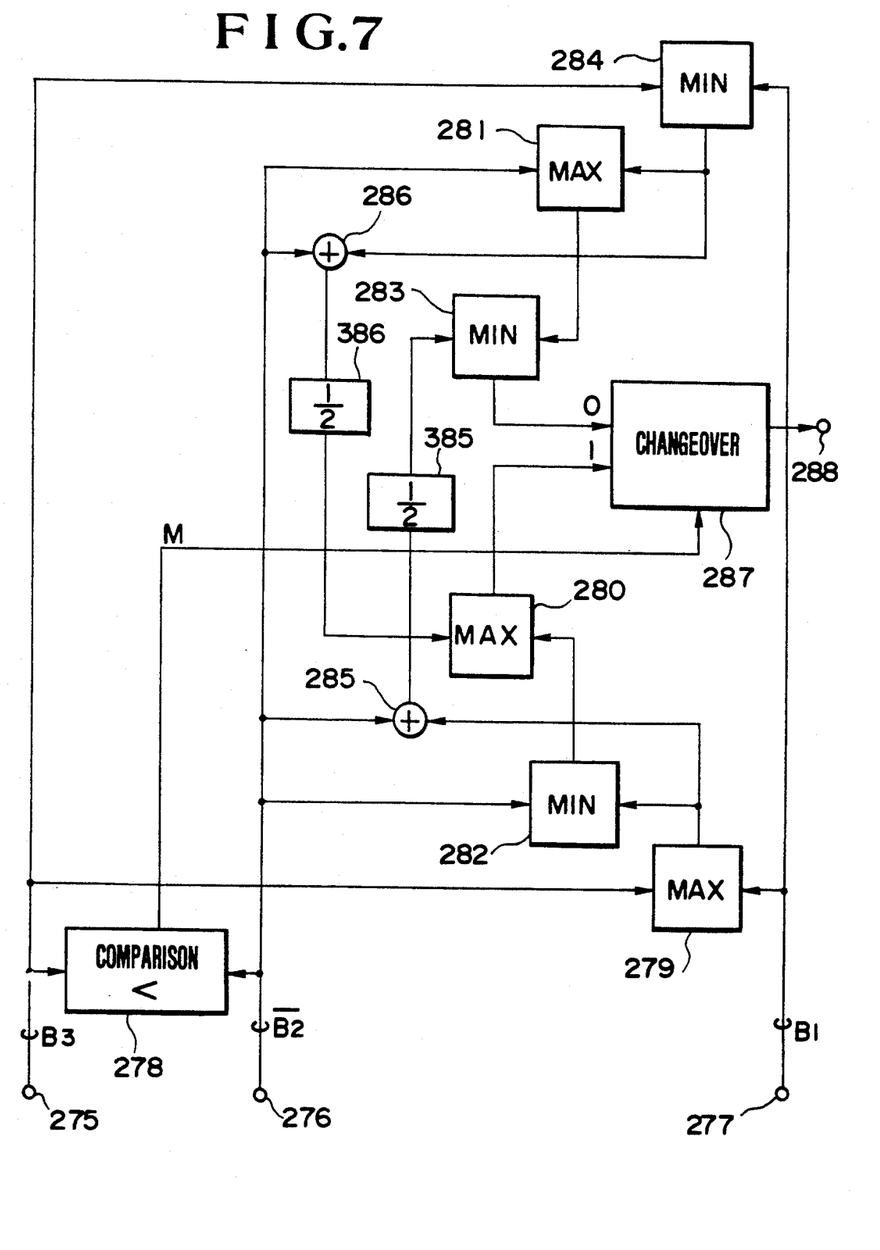
FIGS. 7 and 8 are block diagrams showing, respectively, other embodiments of the pulse pattern suppressing circuit shown in FIG. 6.

FIG. 7 is a block diagram showing another concrete example of the pulse pattern suppressing circuit 274 shown enclosed by a broken line in FIG. 6. In FIG. 7, reference numerals 275 to 277 denote input terminals, respectively, 278 denotes a level comparing circuit, 279 to 281 denote MAX circuits, respectively, 282 to 284 denote MIN circuits, respectively, 285 and 286 denote addition circuits, respectively, 385 and 386 denote attenuation circuits for attenuating by ½ the amplitudes of the output signals from the addition circuits 285 and 286, respectively, 287 denotes a changeover switch circuit, and numeral 288 denotes an output terminal, Referring to FIG. 7, there are applied to the input terminals 275, 276 and 277 the chroma-band components $B_3$, $\overline{B2}$ and $B_1$, respectively, shown in FIG. 6. The level comparing circuit 273 compares the levels of the chroma-band components $\overline{B2}$ and $B_3$ to thereby generate a control signal M which assumes the value of "1", when $\overline{B2} > B_3$, while assuming "0" when $\overline{B2} \leq B_3$. The changeover switch circuit 287 is controlled by the abovementioned control signal M such that the output component of the MAX circuit 280 is selected when the control signal M is "1", while the output component of the MIN circuit 283 is selected when the control signal M is "0".

The MAX circuit 279 selects either one of the chroma-band components $B_1$ and $B_3$ which has a higher level than the other, while the MIN circuit 282 selects one of the component selected by the MAX circuit 279 and the chroma-band component $\overline{B2}$ which is of a lower level than the other. Finally, the component selected by the MAX circuit 279 and the chroma-band component $\overline{B2}$ are added together by the addition circuit 285 and the product is attenuated by ½ in amplitude by the attenuation circuit 385. In other words, both components mentioned above are added and averaged through the addition circuit 285 and the attenuation circuit 385.

The MAX circuit 279 and the MIN circuit 282 cooperate to constitute a positive pulse pattern suppressing circuit which receives as the inputs thereto the chroma-band components $B_1$, $\overline{B2}$ and $B_3$, respectively, and operates with the same structure in the same manner as the positive pulse pattern suppressing circuit 204 shown in FIG. 4.

The MIN circuit 284 selects one of the chromaband components $B_2$ and $B_3$ which is of a lower level than the other, while the MAX circuit 281 selects one of the chroma-band component selected by the MIN circuit 284 and the chroma-band component $\overline{B2}$ which is of a higher level than the other. Thus, it can be said that the MIN circuit 284 and the MAX circuit 281 cooperate to constitute a negative pulse pattern suppressing circuit having the chroma-band components $B_1$, $\overline{B2}$ and $B_3$ supplied thereto as the input data and capable of operating with a same structure in a same manner as the negative pulse pattern suppressing circuit 208 shown in FIG. 4. The chroma-band component selected by the MIN circuit 284 is added with the chroma-band component $\overline{B2}$ by the addition circuit 286, the output of which is then attenuated to a half by the attenuation circuit 386. In other words, both chroma-band components mentioned above are added and averaged (additively averaged).

The MAX circuit 280 selects one of the component selected by the MIN circuit 282 and the output component of the attenuation circuit 386 which has a higher level than the other, while the MIN circuit 283 selects one of the component selected by the MAX circuit 281 and the output component of the attenuation circuit 385 which has a lower level than the other. Either one of the output components of the MAX circuit 280 and the MIN circuit 283 is selected by the changeover switch circuit 287 to be supplied from the output terminal 288 to the inverter 257 and the addition circuit 258 shown in FIG. 6.

The following table 5 shows the output components of the individual circuits mentioned above for the level relations (patterns) among the chroma-band components $B_1$, $\overline{B2}$ and $B_3$.

TABLE 5

| No. | Chroma-bands $B_1, B_2, B_3$ | MAX 279 | MIN 282 | Addition/ Average 385 | MIN 284 | MAX 281 | Additive Average 386 | MAX 280 | MIN 283 | Change-over 287 |
|---|---|---|---|---|---|---|---|---|---|---|
| I | 1 1 0 | 1 | 1 | 1 | 0 | 1 | ½ | 1 | 1 | 1 |
| II | 0 1 1 | 1 | 1 | 1 | 0 | 1 | ½ | 1 | 1 | 1 |
| III | 1 -1 0 | 1 | -1 | 0 | 0 | 0 | ½ | ½ | 0 | 0 |
| IV | 0 -1 1 | 1 | -1 | 0 | 0 | 0 | ½ | ½ | 0 | 0 |
| V | 1 1 1 | 1 | 1 | 1 | 1 | 1 | 1 | 1 | 1 | 1 |
| VI | 1 -1 1 | 1 | -1 | 0 | 1 | 1 | 0 | 0 | 0 | 0 |

Now assuming that one line not colored exists in a picture of a same color and that the chroma-band component $\overline{B2}$ constitutes this line, then $B_1, \overline{B2}, B_3 = \pm 1, 0, 1$. Thus, there makes appearance a negative or positive pulse pattern. In the case of the negative pulse pattern (i.e. when $B_1 = B_3 = 1$), the output component of the MAX circuit 281 is either $B_1$ or $B_3$ which assumes "1", resulting in that the output components of the attenuation circuit 385 assumes the value of "½". Consequently, the output component of the MIN circuit 283 is the value of "½". Similarly, in the case of the positive pulse pattern (i.e. when $B_1 = B_3 = -1$), the output component of the MAX circuit 280 assumes a value of "$-½$".

For the positive pattern, the changeover switch circuit 287 selects the output component of the MAX circuit 280, while for the negative pulse pattern, it selects the output component of the MIN circuit 283. Consequently, there are obtained at the output terminal 288 the components of "$-½$" and "$+½$" for the positive and negative pulse patterns, respectively. In case only one line is to be colored with the adjacent or neighbor lines being not colored (i.e. when $B_1, \overline{B2}, B_3 = 0, \pm 1, 0$), there are obtained at the output terminal 288 the components of $\pm ½$ for the line to be colored in the similar manner.

As will be understood from the above description, the instant embodiment can enjoy similar advantageous effects as those of the pulse pattern suppressing circuit 274 described hereinbefore by reference to FIG. 6.

Figure 8:
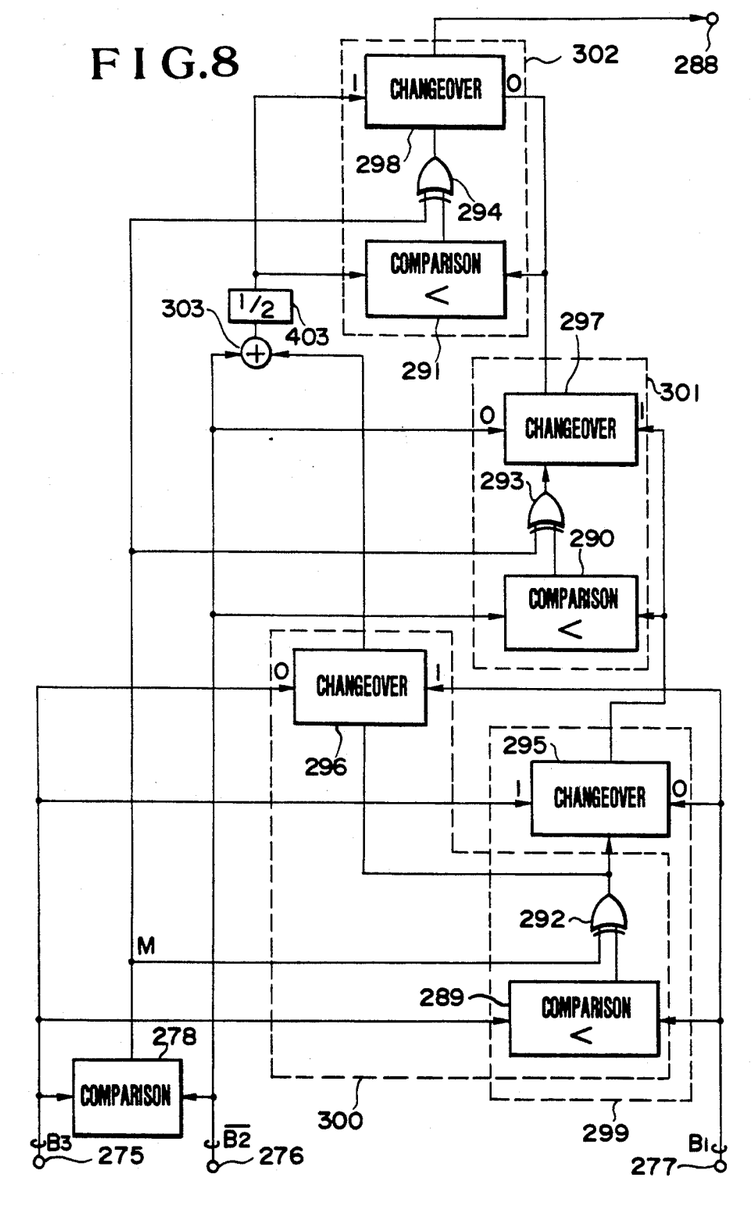

FIG. 8 is a block diagram showing still another exemplary configuration of the pulse pattern suppressing circuit 274 shown in FIG. 6. In FIG. 8, reference numerals 289 to 291 denote level comparing circuits, 292 to 294 denote EOR (Exclusive-OR) circuits, 295 to 298 denote changeover switch circuits, 299 to 302 denote MIN/MAX circuits, 303 denotes an addition circuit, and numeral 403 denotes an attenuation circuit for attenuating the amplitude of the output signal of the addition circuit 303 by ½. In FIG. 8, parts corresponding to those shown in FIG. 7 are designated by like reference numerals and repeated description thereof are omitted.

As will be understood from the comparison with the MIN/MAX circuits 233 and 234 shown in FIG. 5, in the pulse pattern suppressing circuit 274 shown in FIG. 8, the level comparing circuit 289, the EOR circuit 292 and the changeover switch circuit 295 constitute the MIN/MAX circuit 299. The level comparing circuit 289, the EOR circuit 292 and the changeover switch circuit 296 constitute the MIN/MAX circuit 300. The level comparing circuit 290, the EOR circuit 293 and the changeover switch circuit 297 constitute the MIN/MAX circuit 301. And, the level comparing circuit 291, the EOR circuit 294 and the changeover switch circuit 298 constitute the MIN/MAX circuit 302, wherein each of these MIN/MAX circuits functions as the MIN circuit or MAX circuit in dependence on the results of the comparison performed by the level comparing circuit 278.

The following table 6 shows operations of the MIN/MAX circuits 299 to 302 in correspondence to the values of the control signal M outputted from the level comparing circuit 278.

TABLE 6

| Relation in Magnitude between $B_2$ and $B_3$ | Control Signal M | MIN/MAX 299 | MIN/MAX 300 | MIN/MAX 301 | MIN/MAX 302 |
| --- | --- | --- | --- | --- | --- |
| $B_2 > B_3$ | 1 | as MAX | as MIN | as MIN | as MAX |
| $B_2 \leq B_3$ | 0 | as MIN | as MAX | as MAX | as MIN |

As can be seen from the above table 6, the pulse pattern suppressing circuit shown in FIG. 8 is of the same structure as that of the circuit connected to the terminal 1 of the changeover switch circuit 287 shown in FIG. 7, when the control signal M assumes a value of "1", while when the control signal M is "0", the structure of the pulse pattern suppressing circuit becomes same as that of the circuit connected to the terminal 0 of the changeover switch circuit 287 shown in FIG. 7.

Thus, the pulse pattern suppressing circuit mentioned above can enjoy advantageous effects similar to those of the circuit shown in FIG. 7. Besides, the pulse pattern suppressing circuit shown in FIG. 8 is advantageous over that shown in FIG. 7 in that the circuit configuration can be significantly simplified. More specifically, in the case of the pulse pattern suppressing circuit shown in FIG. 7, the number of the MAX and MIN circuits as required is six in total. In contrast, in the circuit shown in FIG. 8, only four MIN/MAX circuits are sufficient each with a structure complicated little over the MAX circuit and the MIN circuit, although the EOR circuit is additionally required in the embodiment shown in FIG. 8. Further, no more than one addition circuit is required. Further, the changeover switch circuit 287 shown in FIG. 7 can be spared.

It goes without saying that the embodiment of the invention shown in FIG. 8 can also be applied to the circuit shown in FIG. 5.

As will be appreciated from the foregoing description, the filter circuit according to the present invention requires only one positive pulse pattern suppressing circuit and only one negative pulse pattern suppressing circuit. Besides, a single circuit may be exchangeably operated as the positive or negative pulse pattern suppressing circuit Thus, there can be attained remarkable simplification of the circuit structure.

Further, by applying the filter circuits described above to the luminance/carrier chrominance separation circuit according to the teachings of the present invention, the circuit structure can be considerably simplified. Moreover, cross-color is reduced, resolution of the luminance signal is protected against degradation, and erroneous Y/C separating operation is diminished. Thus, enhanced separation performance can be assured.

Figure 9:
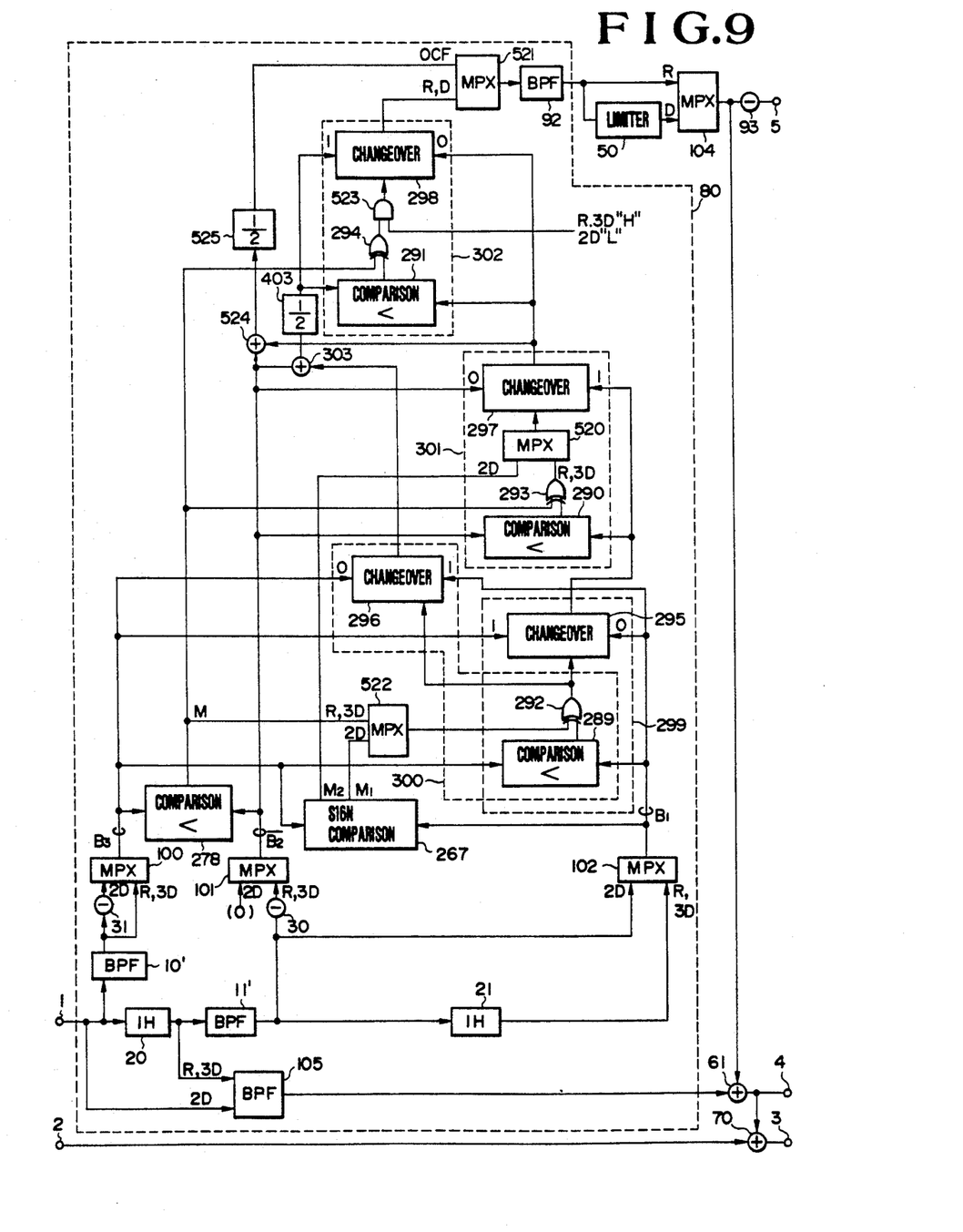
FIG. 9 is a block diagram showing still another embodiment of the present invention.

FIG. 9 is a block diagram showing a circuit comprising in combination a comb line filter for eliminating color Moiré and a Y/C separation circuit with a simplified arrangement according to a still further embodiment of the present invention. In FIG. 9, parts common to those shown in FIGS. 3 and 8 are denoted by like reference numerals, and detailed description thereof will be omitted.

In FIG. 9, reference numerals 520, 521 and 522 denote changeover switch circuits, 523 denotes an AND circuit, 524 denotes an addition circuit and 525 denotes an attenuating circuit for attenuating the amplitude by ½.

When the circuit shown in FIG. 9 is to be used as the luminance/carrier chrominance separation circuit, one of the input terminals of the AND circuit 523 is fixed at a level of "H" so that the output of the EOR 294 can be inputted to the changeover switch circuit 298. Additionally, the changeover switch circuits 100, 101, 102, 104, 105, 520, 521 and 522 are each closed to the terminal R. With such circuit connection, there can be realized a same circuit configuration as that shown in FIG. 8. When the filter circuit according to the invention is to be applied to the Y/C separation circuit disclosed in the literature "IEEE Trans.", Vol. CE-31 mentioned hereinbefore, this can be realized by closing the changeover switch circuit 521 to the terminal OCF.

In conjunction with the use as the color Moiré eliminating comb line filter, the circuit shown in FIG. 9 is so arranged that two different operations can be performed, as in the case of the embodiment shown in FIG. 3. When the centroid is not to undergo a line delay, as described hereinbefore by reference to FIG. 3, one of the input terminals of the AND circuit 523 is fixed at a level "L", and the output of the changeover switch circuit 297 is constantly selected by the changeover switch circuit 298. Further, the changeover switch circuits 104 and 105 are closed to the respective terminal D, while the changeover switch circuits 100, 101, 102, 105, 520 and 522 are closed to the respective terminals 2D. With such connection, the circuit operation equivalent to the operation mode in which no line delay is involved, as described hereinbefore by reference to FIG. 3, can be realized.

On the other hand, when the circuit shown in FIG. 3 is to be operated in a mode equivalent to that of FIG. 3, in which the line delay is involved, the changeover switch circuit 104 is closed to the terminal D while the changeover switch circuits 100, 101, 102, 105, 520 and 522 are closed to the respective terminals 3D. Further, the changeover switch circuit 521 is closed to the terminal OCF. With such connection, there can be realized the operation equivalent to that of an circuit shown in FIG. 3. When the comb line filter of the structure shown in FIG. 8 is to be employed, one of the input terminals of the AND circuit 523 is fixed to the level "H" so that the output of the EOR circuit 294 is inputted to the changeover switch circuit 298 with the changeover switch circuit 521 being connected to the terminal D.

We claim:

1. A pulse pattern suppressing circuit for suppressing pulse patterns in dependence on relations in level among first, second and third input signals, respectively, comprising:

a pulse pattern suppressing circuit having inputs supplied with said first, second and third input signals for suppressing selectively a positive pulse pattern and a negative pulse pattern;

a discriminating circuit for discriminatively identifying said positive pulse pattern and negative pulse pattern on the basis of said level relation of said first input signal or said third input signal relative to said second input signal; and control means for controlling said pulse pattern suppressing circuit such that, in response to a discriminative identification by said discriminating circuit of a positive pulse pattern, said pulse pattern suppressing circuit produces an output signal with the positive pulse pattern suppressed and, in response to a discriminative identification by the discriminating circuit of a negative pulse pattern, said pulse pattern suppressing circuit produces an output signal with the negative pulse pattern suppressed.

2. A filter circuit employing pulse pattern suppressing circuits as set forth in claim 1, comprising:

a first pulse pattern suppressing circuit connected to receive a first set of first, second and third input signals;

a second pulse pattern suppressing circuit connected to receive a second set of first, second and third signals;

a first additively averaging circuit for additively averaging said first input signal and said second input signal of said first pulse pattern suppressing circuit; and a second additively averaging circuit for additively averaging said second input signal and said third input signal of said first pulse pattern suppressing circuit, wherein the first input signal of said second pulse pattern suppressing circuit is constituted by the output of said fist additively averaging circuit, the second input signal of said second pulse pattern suppressing circuit is constituted by the output of said first pulse pattern suppressing circuit, and the third input signal of said second pulse pattern suppressing circuit is constituted by the output of said second additively averaging circuit.

3. A luminance/carrier chrominance signal separating circuit including the filter circuit set forth in claim 2, comprising:

first line-delaying means for delaying an input composite picture signal to thereby output a first delayed composite picture signal containing a carrier chrominance signal component of phase substantially opposite to that of the carrier chrominance signal component contained in said input composite picture signal;

second line-delaying means for delaying said first delayed composite picture signal to thereby output a second delayed composite picture signal containing a carrier chrominance signal component of phase substantially the same as that of said carrier chrominance signal component contained in said input composite picture signal;

first and second band pass filters for extracting signal components of a carrier chrominance band contained in said input composite picture signal and said second delayed composite picture signal to thereby supply said signal components as said first and third input signals to said first pulse pattern suppressing circuit;

a third band pass filter for extracting said carrier chrominance signal component contained in said first delayed composite picture signal;

first sign inverting means for inverting the phase of the carrier chrominance signal component extracted by said third band pass filter, and for supplying the carrier chrominance signal component of inverted phase subsequently as said second input signal to said first pulse pattern suppressing circuit;

second sign inverting means for inverting the phase of the output signal of said filter circuit and outputting a carrier chrominance signal; and addition circuit for adding together the output signal of said filter circuit and said first delayed composite picture signal to thereby output a luminance signal.

4. A filter circuit, comprising:

first filter circuit means for receiving at least a first set of first, second and third input signals and for producing at lest an output signal;

second filter circuit means for receiving at lest a second set of first, second and third input signals and for producing at least an output signal;

a first arithmetic mean circuit for performing an arithmetic mean operation on the first and second input signals of the first filter circuit means; and a second arithmetic mean circuit for performing an arithmetic mean operation on the second and third input signals of the first filter circuit means;

wherein said second filter circuit means is connected such that the first, second and third input signals of the second filter circuit means are an output signal of said first arithmetic mean circuit, an output signal of said first filter circuit means and an output signal of said second arithmetic mean circuit, respectively.

5. A filter circuit according to claim 4, wherein each of said first and second filter circuit means comprises:

a pulse pattern suppressing circuit for suppressing selectively positive and negative pulse patterns in dependence on relations in level among the set of first, second and third input signals supplied thereto;

a discriminating circuit for discriminatively identifying said positive and negative pulse patterns on the basis of a level relation of said first input signal relative to said second input signal or said third input signal relative to said second input signal among the set of input signals supplied to said pulse pattern suppressing circuit; and control means for controlling said pulse pattern suppressing circuit such that, in response to a discriminative identification by the discriminating circuit of a positive pulse pattern, said pulse pattern suppressing circuit produces an output signal with the positive pulse pattern suppressed and, in response to a discriminative identification by the discriminating circuit of a negative pulse pattern, said pulse pattern suppressing circuit produces an output signal with the negative pulse pattern suppressed.

6. A luminance/carrier chrominance signal separating circuit for receiving a composite picture signal, separating said composite picture signal into a luminance signal and a carrier chrominance signal and outputting the separated luminance and carrier chrominance signals, comprising:

line-delay means for delaying the received composite picture signal to thereby output a delayed composite picture signal containing a carrier chrominance signal component having a phase substantially opposite to that of the carrier chrominance signal component contained in said received composite picture signal;
   first separation means for separating a signal component of the carrier chrominance signal band from said composite picture signal;
   second separation means for separating a signal component of the carrier chrominance signal band from said delayed composite picture signal;
   line-delay/separation means for outputting a signal component of carrier chrominance signal band of phase substantially opposite to that of the carrier chrominance signal component separated by the second separation means;
   phase inversion means for inverting the phase of the signal component outputted from said second separation means;
   a first pulse pattern suppressing filter circuit having a first input, a second input and a third input, for receiving signal components outputted from said first separation means, said phase inversion means and said line-delay/separation means, respectively;
   a first arithmetic mean circuit for performing an arithmetic mean operation on the signal components outputted from said first separation means and said phase inverting means;
   a second arithmetic mean circuit for performing an arithmetic mean operation on the signal components outputted from said first separation means and said phase inverting means;
   a second pulse pattern suppressing filter circuit having a first input, a second input and a third input for receiving output signals of said first arithmetic mean circuit, said first pulse pattern suppressing filter circuit and said second arithmetic mean circuit, respectively; and
   an adding circuit for removing from said delayed composite picture signal obtained by said first separation means an output signal of said second pulse pattern suppressing filter circuit;
   wherein said output signal of said second pulse pattern suppressing filter circuit is said separated carrier chrominance signal and the separated luminance signal is outputted from said adding circuit.

7. A filter circuit according to claim 6, wherein each of said first and second pulse pattern suppressing filter circuits comprises:

a pulse pattern suppressing circuit for suppressing selectively positive and negative pulse patterns in dependence on relations in level among signals received at said first, second and third inputs of said first pulse pattern suppressing circuit, respectively;
   a discriminating circuit for discriminatively identifying said positive and negative pulse patterns on the basis of a level relation of the signal at said first input relative to the signal at said second input or the signal at said third input relative to the signal at said second input of said pulse pattern suppressing circuit; and
   control means for controlling said pulse pattern suppressing circuit such that, in response to a discriminative identification by the discriminating circuit of a positive pulse pattern, said pulse pattern suppressing circuit produces an output signal with the positive pulse pattern suppressed and, in response to a discriminative identification by the discriminating circuit of a negative pulse pattern ,said pulse pattern suppressing circuit produces an output signal with the negative pulse pattern suppressed.

* * * * *